Figure 1:
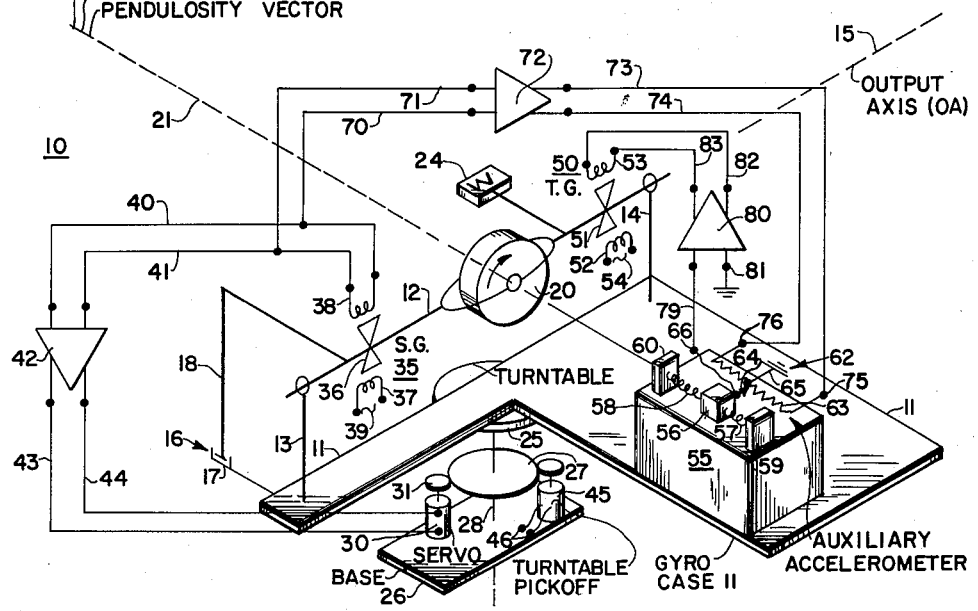

INVENTOR.
JOHN EDWARD ANDERSON

United States Patent Office 3,011,350
Patented Dec. 5, 1961

3,011,350
CONTROL APPARATUS
John Edward Anderson, Robbinsdale, Minn., assignor to Minneapolis-Honeywell Regulator Company, Minneapolis, Minn., a corporation of Delaware
Filed Oct. 17, 1958, Ser. No. 767,940
11 Claims. (Cl. 73—504)

This invention pertains to compensating a pendulous accelerometer for cross-coupling errors. A pendulous accelerometer by definition comprises in part an element pendulously mounted for movement about an axis, this axis normally being identified as an output axis. The pendulum normally responds to acceleration having a component along an input axis so as to move about the output axis. The input axis by definition is perpendicular to the output axis. It will be understood that there is a cross-coupling or third axis which is mutually perpendicular with respect to the input axis and the output axis. It has been found when a pendulous accelerometer has oscillatory accelerations applied thereto simultaneously along its input axis and along its cross-coupling axis that, depending upon the phase relationship between the accelerations, a torque rectification may take place as a result of the interaction between the two accelerations, the effect of the torque rectification being to move the pendulous element about the output axis to a position different than the element would have if it were responding only to the acceleration along the input axis. For example, assuming oscillatory accelerations both along the input axis and along the cross-coupling axis, the pendulous element is displaced or moved about the output axis by an amount of 1.1 units while if the pendulous element were responding only to the acceleration along the input axis it would be displaced or moved about said output axis only 1.0 units. The cross-coupling errors are caused also by unidirectional accelerations applied simultaneously along the input axis and cross-coupling axis. The response of the accelerometer to the cross-coupling acceleration is obviously undesirable due to the errors that it introduces into the control system in which the accelerometer is being used. For example, when a pendulous gyro accelerometer is used in an inertial navigation system for sensing acceleration of the craft and producing through its associated apparatus a signal proportional to the velocity of the craft it will be understood that a false acceleration error, such as produced by cross-coupling torque, will appear at the output as a false velocity signal, and accordingly the entire inertial navigation system output will be inaccurate due to this effect.

It is an object of the present invention therefore to provide an improved control apparatus.

A further object of the invention is to provide a means for compensating a pendulous accelerometer for cross-coupling errors.

Another object of this invention is to provide a means for developing corrective signals in a system utilizing a pendulous accelerometer, said signals being a function of rotation of the pendulous element about its output axis and the amount of acceleration along the cross-coupling axis; the signal being applied back to the pendulous element in such a way so as to return the pendulous element to the position about its output axis wherein it would be in absence of the cross-coupling torque.

Figure 2:
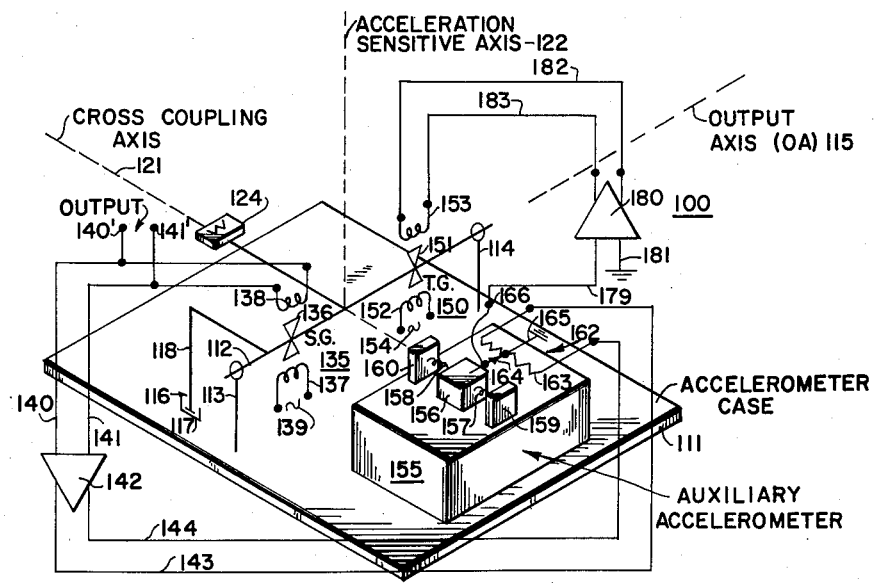

These and other objects will become more apparent from a reading of the following specification and appended claims in connection with the drawings in which:

FIGURE 1 is an isometric view in schematic form of a pendulous gyro accelerometer compensated for cross-coupling torque according to the teaching of the present invention; and FIGURE 2 is an isometric view schematically shown of a pendulous accelerometer compensated for cross-coupling torque according to the teaching of the present invention.

Referring to FIGURE 1, reference numeral 10 designates a pendulous gyro accelerometer compensated for cross-coupling torque. The pendulous gyro accelerometer per se includes a gyro case 11 and a gimbal assembly 12. The support for the gimbal assembly 12 for rotation relative to the gyro case 11 about an output axis is schematically shown by a pair of supports 13 and 14 which define a pivotal or output axis (OA) 15. The gimbal assembly 12 has suitable extensions which coact with the supports 13 and 14. It will be understood that in the usual case (although not necessarily exclusively so) the pendulous gyro accelerometer per se will be a floated instrument as broadly taught in the Jarosh et al. Patent 2,802,956 which issued August 13, 1957. The flotation of the gimbal assembly 12 with respect to the case 11 and the inherent viscous damping produced thereby is schematically represented in FIGURE 1 by a damper 16 including a part 17 connected to the base 11 and a second part 18 connected to the gimbal assembly 12.

The gimbal assembly 12 further includes a rotor element 20 adapted for rotation with respect to the gimbal assembly 12 about a spin reference axis (SRA) 21. It will be understood that suitable means are provided for journalling the rotor element 20 relative to the gimbal assembly 12 and that further suitable means are provided for rotating the rotor 20. The spin reference axis 21 is perpendicular to the output axis 15. It will be understood that there is a gyro input axis (IA) which is perpendicular to both the output axis 15 and the spin reference axis 21. This is identified in FIGURE 1 by reference numeral 22. As is well understood by those skilled in the art, movement of the gyro case 11 about the input axis 22 will cause a precession of the gimbal assembly 12 about the output axis 15. The gimbal assembly 12 is made pendulous by the addition of a suitable inertia element W identified by reference numeral 24 which is mounted eccentrically on the gimbal assembly and is so positioned that its pendulosity vector is either aligned with or parallel to the spin reference axis 21. In FIGURE 1 the pendulous element is shown parallel with the spin reference axis 21 but it will be understood that in the usual apparatus the pendulous weight 24 is so related to the gimbal assembly that the pendulosity vector is aligned with the spin reference axis. The matter of whether the pendulosity vector is aligned with or parallel to the spin reference axis 21 is not critical. However, it is important that the pendulosity vector be perpendicular to the gyro input axis 22. With the pendulous element 24 arranged as shown in FIGURE 1 the gimbal assembly becomes sensitive to accelerations along the gyro input axis 22. Thus the gyro input axis 22 also becomes the acceleration sensitive axis or normal acceleration input axis for the device.

The gyro case 11 is mounted on a suitable turntable device 25 and the turntable 25 is mounted for rotation about a turntable axis with respect to a base 26. The arrangement is such so that the turntable axis is either parallel with or aligned with the gyro input axis 22. In FIGURE 1 the turntable axis is shown aligned with the gyro input axis 22. The means which provides a rotational axis or turntable axis for the turntable 25 includes a gear train element 27 positioned on a shaft 28. The shaft 28 is rotatably associated with the base 26 and is in driving communication with the turntable 25. A suitable servo motor 30 is operatively connected between the base 26 and the turntable 25. As shown, the servo 30 is mounted on the base and includes a pinion gear 31 adapted to mesh with the aforementioned gear element 27. In some embodiments a servomotor 30 would be mounted directly on the turntable and would rotate therewith. It will be understood that the servomotor 30 is adapted to be energized and when energized will cause relative rotation between the turntable and the base.

Means are provided in this apparatus for producing a signal indicative of movement or rotation of the gimbal assembly 12 about the output axis 15. This signal producing or signal generating means is identified in FIGURE 1 by the reference numeral 35 and includes a rotor element 36 connected to the gimbal assembly 12 and a pair of windings 37 and 38. Winding 37 schematically represents a primary winding adapted to be energized by a suitable source of alternating current 39 and winding 38 schematically represents a secondary winding adapted to have developed therein an alternating signal of variable phase and magnitude according to the sense and magnitude of movement or rotation of the gimbal assembly 12 about the output axis 15. It will be understood that any suitable type of signal producing means may be used and that the invention is not limited to any particular device. One suitable type of signal producing means is that shown in the Mueller Patent 2,488,734, issued November 22, 1949. The secondary winding 38 of the signal generating means 35 is connected by suitable connection means 40 and 41 to a suitable amplifier 42 which in turn is connected through suitable connection means 43 and 44 to the servo motor 30. It will be understood that the normal preferred operation of the pendulous gyro accelerometer thus far described involves the gimbal assembly 12 responding to acceleration along the acceleration sensing axis 22, this acceleration reacting with the pendulous mass 24 so as to rotate the gimbal assembly 12 about the output axis 15. This resulting rotation about the output axis develops a signal of a certain phase and magnitude in the secondary winding 38 of the signal generating means. This signal is applied through connection means 40 and 41 to the amplifier 42 and from there to the servo motor 30 through connection means 43 and 44. It will be understood that the servo motor 30 is energized as a result of this signal so as to rotate the turntable 25 relative to the base 26. Since the gyro is mounted integrally with the turntable 25 it follows that the gyro is rotated therewith. Further, the gyro input axis is oriented so as to be aligned or parallel with the turntable axis and accordingly any rotation of the turntable relative to the base constitutes a rotation of the gyro about its input axis. The sense of rotation of the gyro is such that the gyro gimbal assembly will be precessed about its output axis 15 in a sense so as to tend to return the gimbal to its initial position. A steady state acceleration acting on the pendulous mass 24 will develop a certain torque acting to rotate the gimbal assembly 12 about the output axis 15. The action of the signal generating means energizing the servomotor is to rotate the turntable 25 at a rate and in the proper direction so as to develop a precessional torque acting on the gimbal assembly 12 that is equal and opposite to the torque produced by the initial acceleration. It will be understood that under steady state acceleration conditions the turntable will be rotating at a constant rate which will exactly cancel out or oppose the torque caused by the input acceleration. The rotation of the turntable is thus a measure of input acceleration. More specifically, the velocity of rotation of the turntable is a measure of acceleration and it follows therefore that the total amount of turntable rotation or angular displacement is the integral of linear acceleration or the linear velocity of the device upon which the accelerometer is mounted. Suitable means are provided for measuring the magnitude of turntable angular displacement. This means is schematically shown in FIGURE 1 by a turntable pickoff 45 suitably coupled to the gear train element 27 and which further comprises a pair of output terminals 46 which are adapted to be connected to suitable control means such as an inertial navigation system (not shown). The pickoff means 45 is schematically shown and in actual practice could be an analog device such as a multi-turn potentiometer pickoff or could be a digital pickoff such as is shown in the co-pending application of Vernon H. Aske and Arthur D. Glick, filed November 19, 1958, Serial No. 774,952, and assigned to the same assignee as the present application. The exact details of the pickoff form no part of the present invention and accordingly are not shown.

Means are provided for rotating the gimbal assembly 12 about its output axis 15 without the use of gyroscopic precessional forces. This means is schematically shown as a torque generator 50 including a rotor element 51 attached to the gimbal assembly 12 and a pair of windings 52 and 53. Torque generator 50 may be of any suitable type such as, for example, as shown in said Mueller patent. Winding 52 may be considered to be a primary winding and is adapted to be energized by a suitable source of alternating current 54 and winding 53 may be considered as a control winding adapted to be energized by an alternating current of variable phase and magnitude so as to torque the gimbal assembly 12 in one sense or the other and of the proper magnitude depending upon the signal applied thereto. Such torque generating means are often provided for introducing command signals into the pendulous gyro accelerometer and into the system associated therewith.

Means are provided for sensing the acceleration of the gyro case 11 along the cross-coupling axis 21. This cross-coupling acceleration sensing means is identified in FIGURE 1 as an auxiliary accelerometer 55 shown schematically to be mounted on the gyro case 11. The auxiliary accelerometer 55 includes an inertia element 56 suitably mounted for reciprocation relative to its base along an input axis and restrained by a pair of suitable compression springs 57 and 58 between a pair of fixed supports 59 and 60 respectively so that in the absence of any input acceleration it has a null position as shown in FIGURE 1. It will be understood that the auxiliary accelerometer 55 is oriented so that its acceleration sensing axis is either parallel to or aligned with the spin reference axis 21 of the pendulous gyro accelerometer. It will be further understood that any suitable type of linear accelerometer may be provided and that the invention is not limited to the type of linear accelerometer shown in FIGURE 1. A suitable signal producing means associated with the auxiliary accelerometer 55 is identified in FIGURE 1 by the reference numeral 62. The pickoff or signal producing means 62 is shown to be a potentiometer including a resistance element 63 and a wiper element 64. The wiper element 64 is integrally connected to the inertia element 56 of the auxiliary accelerometer 55 and as such is adapted to move therewith in response to acceleration along the spin reference axis 21. The resistance portion 63 of the potentiometer 62 is mounted on the base 11 and is electrically connected to ground 65 at the point wherein the wiper 64 rests at its null position in the absence of cross-coupling acceleration. The wiper element 64 is provided with a flexible connection having a terminal 66. While a potentiometer type pickoff 62 has been shown associated with the auxiliary accelerometer 55 it will be understood that any suitable source of signal producing or pickoff means may be provided, examples being strain gage type pickoffs, capacitive pickoffs, inductive pickoffs, optical pickoffs, and the like.

Means are provided for energizing the resistance portion 63 of the pickoff 62 with a signal indicative of the signal produced by the signal generating means 35 on the gyro. This means as shown includes a pair of suitable leads 70 and 71 connected at one end in parallel with leads 40 and 41 associated with secondary winding 38 of the signal generator 35 and connected at the other end to a suitable amplifier 72 which in turn has a pair of output leads 73 and 74 which are adapted to be respectively connected to opposite ends 75 and 76 of the resistance element 63 of the potentiometer 62. It will be understood that when the gimbal assembly 12 is at its normal or null position relative to the gyro case 11 that there will be substantially a zero net signal in the secondary winding 38 at that time and accordingly there will be a zero signal applied both to the servo motor 30 as well as to the resistance element 63 of the pickoff 62 on the auxiliary accelerometer 65. It will be further understood that as the gimbal assembly 12 is moved or rotated about its output axis 15 there will be a signal of variable phase and magnitude according to the sense and magnitude of said movement or rotation. Accordingly the resistance element 63 has applied thereto a signal voltage which is a function of the displacement of the gimbal assembly 12 relative to the gyro case 11 about the output axis 15. This constitutes a first input to the pickoff 62. The second input to the pickoff 62 is mechanical in nature constituting the acceleration along the cross-coupling axis 21. It will be understood that when acceleration along the cross-coupling axis 21 is present that the inertial element 56 will move relative to the gyro case 11. Specifically the inertial element 56 will tend to remain fixed in inertial space while the gyro case 11 will move relative thereto. The net effect will be to have relative movement between the inertial element 56 and gyro case 11. Since the winding 63 is attached to the case 11 and the wiper 64 is attached to the inertial element 56 it follows that there will be relative movement between the wiper 64 and the winding 63. When the wiper 64 is at its null position there will be no signal between its terminal 66 and ground 65 regardless of the energization from the signal generator 35 to the winding 63. However, when cross-coupling acceleration is present then the wiper 64 will move relative to the winding 63 and a signal will be developed between terminal 66 and ground 65 which is a function of the product of the gimbal rotation and of the cross-coupling acceleration. This resultant signal is applied from terminal 66 through a suitable connection lead 79 to a first input terminal of a suitable amplifier 80 which has another input terminal 81 connected to ground and which in turn is connected through suitable connection means 82 and 83 to opposite ends of the control winding 53 of the torque generating means 50. It will be understood that the signal sensed between wiper 64 and ground 65 will be applied through the amplifier 80 to the control winding 53 of the torque generator 50 so as to cause rotation of the gimbal assembly 12 relative to the case 11 about the output axis 15.

OPERATION OF FIGURE 1

Above it has been demonstrated how the pendulous gyro accelerometer per se with its associated rebalance loop including the servo motor 30 will cause the turntable 25 to rotate in response to acceleration along the acceleration sensitive axis or gyro input axis 22. That operation was described with the assumption that there was no cross-coupling acceleration being present simultaneously with the normal acceleration. However, in many system applications such as an inertial navigation system used on a dirigible craft such as a guided missile, in addition to the normal acceleration along the gyro input axis 22 there may be a cross-coupling acceleration along the cross-coupling axis 21. It has above been indicated that this cross-coupling acceleration coacting with the normal acceleration will introduce torques tending to rotate the gimbal assembly 12 about its output axis 15. Such torques, it will be understood, will cause the gimbal assembly 12 to be rotated to a position different from the position that it would assume were it not for the cross-coupling acceleration. It follows therefore that the false position of the gimbal will introduce a false signal to be applied to the servo motor 30 and that accordingly a false velocity signal will be produced in the turntable pickoff 45. The cross-coupling torque errors so produced are eliminated in the present invention by applying a signal indicative of the gimbal position and combining it with the cross-coupling acceleration so that a signal which is a function of the product of these two quantities may be produced and is applied in a corrective sense back to the gimbal assembly 12. More specifically the signal indicative of gimbal position is applied through connection means 70 and 71, amplifier 72, and leads 73 and 74 to the pickoff 62. The winding 63 therefore is energized as a function of the position of the gimbal assembly 12 relative to the gyro case 11. When there is cross-coupling acceleration this will be sensed by the inertial element 56 of the auxiliary accelerometer 55 and it will be understood that between the output terminal 66 of the auxiliary accelerometer and ground 65 there will be a signal indicative of the product of the cross-coupling acceleration and the position of the gimbal assembly 12 with respect to the gyro case. This product signal produced by the computing means thus described is applied through amplifier 80 where it is adjusted to the particular scale factor of the gyro being used, and thence applied to the control winding 53 of the torque generator 50. The sense of the signal applied to control winding 53 is such so that it tends to move or rotate the gimbal assembly 12 in a direction opposite to the direction caused by the cross-coupling torque. In other words, if the action of the cross-coupling torque were to tend to rotate the gimbal assembly in a positive sense 0.1 of a unit then the action of the correction loop including the auxiliary accelerometer 55 would be to rotate the gimbal assembly 12 in a negative sense 0.1 of a unit. The net effect on the gimbal assembly 12 is that it has cancelled out or eliminated therefrom any rotation or movement about the output axis due to cross-coupling torque leaving as the net rotation that clearly derived from the acceleration applied along its normal input or acceleration sensitive axis 22. It will be understood that when there is cross-coupling acceleration present but no normal acceleration present that the apparatus will be ineffective to cause gimbal assembly rotation relative to the case 11 which is proper since under that set of conditions there would be no cross-coupling torque produced on the gimbal assembly due to the fact that cross-coupling torque can only be produced when there is coacting simultaneous accelerations (either unidirectional or oscillatory) along the axes 22 and 21. Conversely if there is a normal acceleration present along the acceleration sensitive axis 22 but no cross-coupling acceleration then the signal applied to resistance element 63 of the auxiliary accelerometer 55 is ineffective to cause any torque to be applied to the gimbal assembly 12 through the torque generator 50 due to the fact that the absence of cross-coupling acceleration will maintain the inertial element 56 at its null position relative to the center tap connected to ground 65 on the winding 63. The compensating means thus provided develops a corrective signal at the torque generator 50 only when a cross-coupling torque is produced on the gimbal assembly 12 and as indicated produces a corrective signal that nulls or cancels out the effect of the cross-coupling torque on the gimbal assembly 12. The steady state operation of the apparatus constituting the present invention thus results in a pendulous accelerometer which has a signal indicative only of acceleration along the acceleration sensitive axis 22 and is for all practical purposes substantially immune to any cross-coupling acceleration. Accordingly the output from the pickoff means 45 is a true measure of acceleration and the integral thereof or velocity of the craft upon which case 11 is mounted along the sensitive axis 22.

DESCRIPTION OF FIGURE 2

In FIGURE 2 the present invention is shown applied to a pendulous accelerometer. The basic problem of cross-coupling torque applies to a pendulous accelerometer or element whether a simple pendulum as shown in FIGURE 2 or as a more complex pendulous device as shown in FIGURE 1. In FIGURE 2 a pendulous accelerometer is schematically shown and it may well be similar to the device shown in the co-pending application of Vernon H. Aske entitled "Control Apparatus," filed April 30, 1958, Serial No. 732,077. In FIGURE 2 a pendulous accelerometer is identified by reference numeral 100 and includes an accelerometer case 111 which is adapted to support by suitable means a gimbal assembly 112. The support of the gimbal assembly 112 is schematically shown to be a pair of supports 113 and 114, these elements defining an output axis (OA) 115. A pendulous element 124 is attached to the gimbal assembly 12 and is arranged with its pendulosity vector aligned along a cross-coupling axis 121, this cross-coupling axis being perpendicular to the output axis 115. With this orientation of the pendulous element 124 on the gimbal assembly 112 it will be understood that the element 124 will react with acceleration along the acceleration sensitive axis which is mutually perpendicular with respect to the cross-coupling axis 121 and the output axis 115. The acceleration sensitive axis is identified in FIGURE 2 by the reference numeral 122. It will be understood when there are simultaneous accelerations present along the acceleration sensitive axis 122 and along the cross-coupling axis 121 that a resulting rotation or movement of the gimbal assembly 112 about the output axis 115 will result, the total movement or displacement or rotation about the output axis being different from the movement or rotation that would be present if only the normal acceleration along the acceleration sensitive axis 122 were present. In other words the addition of the acceleration along the cross-coupling axis 121 in reaction with the acceleration along the sensitive axis 122 produces a cross-coupling torque which causes an error in gimbal position.

The flotation of the gimbal 112 and the viscous damping thereof is represented by damping means 116 having elements 117 and 118.

Again means are provided for producing a signal indicative of gimbal rotation relative to the case 111. This is identified by a signal producing means 135 which can be generally similar to signal generator 35 in FIGURE 1 and which includes a rotor element 136 connected to the gimbal 112 and a pair of windings 137 and 138. Winding 137 is a primary winding and is adapted to be energized by a suitable source of alternating current 139 and winding 138 is an output winding adapted to have induced therein an alternating voltage of variable phase and magnitude according to the sense and magnitude of the movement or rotation of the gimbal assembly 112 relative to the case 111.

Torque generating means are also provided for rotating or moving the gimbal assembly 112 relative to the case 111. The torque generating means is identified by reference numeral 150 which can be generally similar to device 50 shown in FIGURE 1, and includes a rotor element 151 connected to the gimbal assembly 112 and a pair of windings 152 and 153. Winding 152 represents a primary winding and is adapted to be energized by a suitable source of alternating current 154 and winding 153 represents a control winding adapted when energized to rotate the gimbal assembly 112 relative to the case 111 in one sense or the other about the output axis 115.

An auxiliary accelerometer means 155 is provided and is generally similar to the auxiliary accelerometer means 55 shown in FIGURE 1. It includes an inertial element 156 resiliently restrained for displacement along the cross-coupling axis 121 between a pair of supports 159 and 160. A resilient restraint of the inertial element 156 relative to the base of the accelerometer 155 which in effect is the same as the accelerometer case 111 is provided by a pair of compression springs 157 and 158. A suitable pickoff means 162 is provided for producing a signal indicative of the output of accelerometer 155.

Signal producing means 162 includes a winding 163 and a wiper 164 adapted to coact therewith. When the wiper is at a null position relative to winding 163 it is adjacent to a center-tap 165 connected to ground. A flexible lead terminating in a connection point 166 is provided for electrically connecting a wiper 164 to additional control means.

Means are provided for energizing the resistance element 163 of the pickoff 162 with a signal indicative of the movement of the gimbal assembly 112 about the output axis 115. This means includes a pair of output leads 140 and 141 connected at one end to opposite sides of winding 138 of the signal generating means 135 and at the other end to a suitable amplifier 142 which in turn is connected through a pair of connection leads 144 and 143 to opposite sides of the resistance element 163. It will be understood therefore that the winding 163 has applied thereto a voltage variable in phase and in magnitude according to the movement of the gimbal assembly 112 relative to the accelerometer case 111. When the gimbal 112 is at its null or normal position relative to case 111 it would follow that there is substantially no signal applied to winding 163. It will be further understood that leads 140 and 141 may also be connected through a pair of suitable output terminals 140' and 141' to suitable additional control means such as an inertial navigation system, not shown. The net output from the accelerometer 155 as sensed between the pickoff 164 thereof and ground 165 is applied through its terminal 166 and a suitable connection lead 179 to amplifier 180 also having a grounded input terminal 181. From amplifier 180 a pair of suitable connection leads 182 and 183 connect the amplifier 180 to the control winding 153 and the torque generator 150.

OPERATION OF FIGURE 2

When acceleration is present along the acceleration sensitive axis 122 and simultaneously there is zero acceleration along the cross-coupling axis 121 then the apparatus shown in FIGURE 2 will function in the desired manner by having the pendulous element 124 respond to the acceleration along axis 122 producing a rotation of the gimbal 112 relative to the accelerometer case 111 and developing a signal in winding 138 of the signal generating means 135 which will be taken off at terminals 140' and 141' to be used in a control system not shown. Rebalance signals for the gimbal may be applied to the gimbal through a torque generator 150. When, however, there is simultaneously a cross-coupling acceleration present along the cross-coupling axis 121 it will be understood that a cross-coupling torque will introduce an error into the gimbal position relative to the case 111. For this set of conditions the signal produced by the signal generating means 135 will be applied from its output winding 138 through leads 140 and 141 to the amplifier 142 and from there to the winding 163 of the accelerometer pickoff 162 through the connection leads 143 and 144. The cross-coupling acceleration will react with the inertial element 156 in the accelerometer 155 so that the wiper 164 will move relative to the winding 163. It will be understood that appearing between output terminal 166 and ground 165 of the accelerometer 155 will be a signal indicative of product of the cross-coupling acceleration and the signal indicative of movement or rotation of the gimbal assembly 112 relative to the case 111. The signal from the computing means thus described is applied through lead 179 to the amplifier 180 and from there through leads 182 and 183 to the control winding 153 of the torque generator 150. It will be understood that the sense of energization to torque generator 150 is such to return the gimbal assembly 112 to the position where it would have been due to the normal acceleration along the axis 122 had it not been for the cross-coupling acceleration 121. With the arrangement thus described the apparatus 100 has been compensated for cross-coupling torque and the resulting output at 140' and 141' represents only the true acceleration along the acceleration sensitive axis 122.

While I have shown and described two specific embodiments of this invention, further modifications and improvements will occur to those skilled in the art. I desire it to be understood therefore that this invention is not limited to the particular form or circuitry shown and I intend in the appended claims to cover all modifications which do not depart from the spirit and scope of this invention.

What I claim is:

1. Apparatus of the class described comprising: a pendulous gyro accelerometer including a base, a turntable rotatably mounted on said base for unlimited rotation about a first axis, a pendulous gyro having mutually perpendicular spin reference, output, and input axes positioned on said turntable so that said input axis is parallel to said first axis, first signal producing means for providing a signal indicative of movement of said gyro about said output axis away from an initial position, motor means connected between said base and said turntable, and adapted when energized to rotate said turntable relative to said base, means for energizing said motor means with a signal indicative of the signal from said first signal producing means, said energization of said motor means causing said turntable to rotate about said first axis thus rotating said gyro about said input axis, the sense of rotation about said input axis being such that said gyro tends to be precessed about said output axis toward said initial position, second signal producing means for producing a signal indicative of the direction and magnitude of angular rotation of said turntable relative to said base, a mass pendulously mounted on said gyro so that said gyro tends to be rotated about said output axis in response to acceleration along said input axis; means for applying a torque to said gyro so as to tend to rotate said gyro about said output axis, an auxiliary linear accelerometer adapted to sense linear acceleration and mounted on said pendulous gyro accelerometer with the acceleration sensing axis thereof parallel with said spin reference axis of said gyro, said auxiliary accelerometer including a third signal generating means adapted to respond to acceleration imparted to said auxiliary accelerometer along said sensitive axis thereof; means energizing said third signal producing means with a signal indicative of the signal produced by said first signal producing means, said third signal producing means thus producing a signal indicative of the product of said energization thereto and the acceleration imparted thereto; and means energizing said torque applying means of said gyro with a signal indicative of the signal produced by said third signal producing means.

2. Apparatus of the class described comprising: a pendulous gyro accelerometer including a base, a turntable rotatably mounted on said base for unlimited rotation about a first axis, a pendulous gyro having mutually perpendicular spin reference, output, and input axes positioned on said turntable so that said input axis is parallel to said first axis, first signal producing means for providing a signal indicative of movement of said gyro about said output axis away from an initial position, motor means connected between said base and said turntable, and adapted when energized to rotate said turntable relative to said base, means for energizing said motor means with a signal indicative of the signal from said first signal producing means, said energization of said motor means causing said turntable to rotate about said first axis thus rotating said gyro about said input axis, the sense of rotation about said input axis being such that said gyro tends to be precessed about said output axis toward said initial position, second signal producing means for producing a signal indicative of the direction and magnitude of angular rotation of said turntable relative to said base, a mass pendulously mounted on said gyro so that said gyro tends to be rotated about said output axis in response to acceleration along said input axis; means for applying a torque to said gyro so as to tend to rotate said gyro about said output axis, an auxiliary linear accelerometer adapted to sense linear acceleration and mounted on said pendulous gyro accelerometer with the acceleration sensing axis thereof parallel with said spin reference axis of said gyro, said auxiliary accelerometer including a third signal generating means adapted to be energized and having an output indicative of the energization thereto and of a function of the acceleration applied thereto along said sensitive axis thereof; means energizing said third signal producing means with a signal indicative of the signal produced by said first signal producing means; and means energizing said torque applying means of said gyro with a signal indicative of the signal produced by said third signal producing means.

3. Apparatus of the class described comprising: a pendulous gyro accelerometer including a base, a turntable rotatably mounted on said base for rotation about a first axis, a pendulous gyro having mutually perpendicular spin reference, output, and input axes positioned on said turntable so that said input axis is parallel to said first axis, first signal producing means for providing a signal indicative of movement of said gyro about said output axis, means connected between said base and said turntable, and adapted when energized to rotate said turntable relative to said base, means for energizing said connected means with a signal indicative of the signal from said first signal producing means, said energization of said connected means causing said turntable to rotate about said first axis thus rotating said gyro about said input axis, second signal producing means for producing a signal indicative of a function of angular rotation of said turntable relative to said base, a mass pendulously mounted on said gyro so that said gyro tends to be rotated about said output axis in response to acceleration along said input axis; means for applying a torque to said gyro so as to tend to rotate said gyro about said output axis, an auxiliary accelerometer adapted to sense acceleration and mounted with the acceleration sensing axis thereof parallel with said spin reference axis of said gyro, said auxiliary accelerometer including a third signal generating means adapted to be energized and having an output indicative of the energization thereto and of a function of the acceleration imparted to said auxiliary accelerometer along said sensitive axis thereof; means energizing said third signal producing means with a signal indicative of the signal produced by said first signal producing means; and means energizing said torque applying means of said gyro with a signal indicative of the signal produced by said third signal producing means.

4. Apparatus for compensating a pendulous accelerometer for torque produced by cross-coupling acceleration, said pendulous accelerometer including a pendulous element supported for rotation about an output axis and adapted to rotate about said output axis in response to acceleration having a component along an input axis, said input axis being parallel to an axis/perpendicular to said output axis, signal producing means for producing a signal input axis being parallel to an axis perpendicular to said indicative of rotation of said pendulous element about said output axis, and torque producing means adapted when energized to rotate said pendulous element about said output axis, said apparatus comprising: an auxiliary accelerometer mounted on said pendulous accelerometer and adapted to respond to acceleration having a component along a cross-coupling axis, said cross-coupling axis being perpendicular to said input and said output axes; pickoff means on said auxiliary accelerometer adapted to be energized and having an output indicative of the energization thereto and of the magnitude of the acceleration applied along said cross-coupling axis; means energizing said auxiliary accelerometer pickoff means with a signal indicative of the signal produced by said pendulous accelerometer signal producing means; and means energizing said torque producing means with a signal indicative of the signal produced by said auxiliary accelerometer signal producing means.

5. Apparatus of the class described comprising in combination: a pendulous accelerometer including a pendulous element supported for rotation about an output axis and adapted to rotate about said output axis in response to acceleration having a component along an input axis, said input axis being perpendicular to said output axis and signal producing means for producing a signal indicative of rotation of said pendulous element about said output axis; auxiliary accelerometer means mounted on said pendulous accelerometer and adapted to respond to acceleration having a component along a cross-coupling axis, said cross-coupling axis being perpendicular to said input and output axes; signal producing means on said auxiliary accelerometer means adapted to be energized and having an output indicative of the energization thereto and of the magnitude of the acceleration applied thereto along said cross-coupling axis; means energizing said auxiliary accelerometer signal producing means with a signal indicative of the signal produced by said pendulous accelerometer signal producing means; and control means adapted to be energized with a signal indicative of the signal produced by said auxiliary accelerometer signal producing means and operatively connected to said pendulous element in a manner to compensate for cross-coupling effects.

6. In apparatus for compensating a pendulous accelerometer for torque produced by cross-coupling acceleration the combination of: a pendulous accelerometer including a pendulous element supported for rotation about an output axis and adapted normally to rotate about said output axis in response to acceleration having a component along an input axis, said input axis being parallel to an axis perpendicular to said output axis, signal producing means for producing a signal indicative of rotation of said pendulous element about said output axis, and torque producing means adapted when energized to rotate said pendulous element about said output axis; an auxiliary accelerometer mounted on said pendulous accelerometer and adapted to respond to acceleration having a component along a cross-coupling axis, said cross-coupling axis being perpendicular to said input and output axes; pickoff means on said auxiliary accelerometer adapted to be energized and having an output indicative of the energization thereto and of the magnitude of the acceleration applied thereto along said cross-coupling axis; means energizing said auxiliary accelerometer pickoff means with a signal indicative of the signal produced by said pendulous accelerometer signal producing means; and means energizing said torque producing means with a signal indicative of the signal produced by said auxiliary accelerometer signal producing means.

7. In apparatus for compensating a pendulous accelerometer for cross-coupling torque the combination of: a pendulous accelerometer including a pendulous element supported for movement about an output axis and adapted to move about said output axis in response to acceleration having a component along an input axis perpendicular to said output axis, signal producing means for producing a signal indicative of movement of said pendulous element about said output axis, and force producing means adapted when energized to move said pendulous element about said output axis; and auxiliary accelerometer means adapted to respond to acceleration having a component along a cross-coupling axis, said cross-coupling axis being perpendicular to said input and output axes; pickoff means on said auxiliary accelerometer means adapted to be energized and having an output indicative of the energization thereto and of the magnitude of the acceleration applied along said cross-coupling axis; means energizing said auxiliary accelerometer pickoff means with a signal indicative of the signal produced by said pendulous accelerometer signal producing means; and means energizing said force producing means with a signal indicative of the signal produced by said auxiliary accelerometer signal producing means.

8. Apparatus of the class described comprising in combination: a pendulous element supported for rotation about an output axis and adapted to rotate about said output axis in response to acceleration applied thereto along an input axis perpendicular to said output axis; means for measuring rotation of said pendulous element about said output axis; means responsive to acceleration along a cross-coupling axis perpendicular to said output and input axes; computer means connected to said rotation measuring means and to said cross-coupling acceleration responsive means and adapted to have an output indicative of a function of the rotation of said element and of cross-coupling acceleration; torque producing means connected to said pendulous element and means connecting said output of said computer means to said torque producing means.

9. Apparatus of the class described comprising in combination: a pendulous element supported for movement about an output axis and adapted to move about said output axis in response to acceleration applied thereto along an input axis perpendicular to said output axis; means for measuring movement of said pendulous element about said output axis; means for sensing acceleration along a cross-coupling axis perpendicular to said output and input axes; computer means connected to said movement measuring means and to said cross-coupling acceleration sensing means and adapted to have an output indicative of the product of the movement of said element and cross-coupling acceleration; and means connecting said output of said computer means to additional means operatively connected to said pendulous element in a manner to compensate for cross-coupling effects.

10. Apparatus of the class described comprising in combination: a pendulous element supported for movement about an output axis and adapted to move about said output axis in response to acceleration applied thereto along an input axis perpendicular to said output axis; means responsive to movement of said pendulous element about said output axis; means responsive to acceleration along a cross-coupling axis perpendicular to said output and input axes; computer means connected to said movement responsive means and to said cross-coupling acceleration responsive means and adapted to have an output indicative of a function of the movement of said element and of cross-coupling acceleration; and means for compensating said pendulous element for cross-coupling accelerations comprising means operatively connecting the output of said computer means to said pendulous element.

11. Apparatus of the class described comprising in combination: an inertial element mounted for movement and adapted to move in response to acceleration applied thereto along an input axis; means responsive to movement of said inertial element; means responsive to acceleration along a cross-coupling axis perpendicular to said input axis; computer means connected to said movement responsive means and to said cross-coupling acceleration responsive means and adapted to have an output indicative of a function of the movement of said element and of cross-coupling acceleration; and means for compensating said inertial element for cross-coupling accelerations comprising means operatively connecting the output of said computer means to said inertial element.

References Cited in the file of this patent

UNITED STATES PATENTS

| | | |
|---|---|---|
| 2,266,449 | Ullrich et al. | Dec. 16, 1941 |
| 2,577,061 | Woolson | Dec. 4, 1951 |
| 2,613,071 | Hansel | Oct. 7, 1952 |
| 2,797,911 | Montgomery | July 2, 1957 |
| 2,811,344 | Woestemeyer | Oct. 29, 1957 |
| 2,859,026 | Adamson et al. | Nov. 4, 1958 |
| 2,922,632 | Bondra et al. | Jan. 26, 1960 |

FOREIGN PATENTS

| | | |
|---|---|---|
| 1,060,073 | France | Nov. 18, 1953 |
| 763,225 | Great Britain | Dec. 12, 1954 |

OTHER REFERENCES

Article entitled: "Inertial Guidance for Rocket Propelled Missiles," by W. T. Russell, from Jet Propulsion Magazine, January 1958, pages 17 through 23.